Oct. 7, 1952 M. KALFAIAN 2,613,273

SPEECH WAVE ANALYSIS

Filed Jan. 23, 1947 3 Sheets-Sheet 1

INVENTOR.

BY Megrin Kalfaian

Oct. 7, 1952 M. KALFAIAN 2,613,273

SPEECH WAVE ANALYSIS

Filed Jan. 23, 1947 3 Sheets-Sheet 2

INVENTOR.

Megerdich Kalfaian

BY

Oct. 7, 1952 M. KALFAIAN 2,613,273

SPEECH WAVE ANALYSIS

Filed Jan. 23, 1947 3 Sheets-Sheet 3

INVENTOR.

BY [signature]

Patented Oct. 7, 1952 2,613,273

UNITED STATES PATENT OFFICE 2,613,273

SPEECH WAVE ANALYSIS

Meguer Kalfaian, Asbury Park, N. J.

Application January 23, 1947, Serial No. 723,881

5 Claims. (Cl. 179—1)

(Granted under the act of March 3, 1883, as amended April 30, 1928; 370 O. G. 757)

The invention described herein may be manufactured and used by or for the Government for governmental purposes, without the payment of any royalty thereon.

This invention relates to the analysis of speech waves, and particularly to those waves that are responsible for the intelligibility of phonetic character in spoken sounds. Its main object is to provide a method and means for the analysis of various wave-patterns during the propagation of articulate sounds for the selection and control of phonetic characters contained therein. A corollary object is to translate these selected wave-patterns into discrete signals corresponding to the phonetic characters represented by the speech, whereby these signals may be utilized to selectively actuate character printing keys for the production of visible intelligible indicia.

Previous fundamentally concurring researches on sound waves of speech have shown that intelligibility of each phonetic sound is dependent on the existence of a definite set of parameters, which are governed by the larynx and various contributory structures of the vocal system. There are two independent states in which these parameters collectively define the character of each phonetic sound: (1) the simultaneous existence of a set of frequency components; each having a definite power lever with regard to the others, and (2) the wave-pattern of the sound, which comprises a definite set of waves; each having a definite amplitude with regard to the others. To substantiate the first state, few of the voiced phonetic sounds have been successfully produced by means of sets of synthetic wave production. To substantiate the second state, a large number of graphical recordings of unvoiced (whispered) speech have been examined and shown that the wave-pattern of each phonetic sound is substantially the same regardless of the individual speaking. This shows that action of the larynx contributes to the predominating factors manifested in the first state, and formation of the mouth contributes to the predominating factors manifested in the second state. Owing to these independent states in which phonated sounds are recognized, there have been previous efforts to translate spoken words into visual words, by analyzing either the frequency components, or the wave-patterns, during the propagation of the sound wave. However, numerous difficulties involve in each case, and impose severe restrictions upon the apparatus used. For example, in the first case, the frequency pitch of each speaking voice differs from the others, and therefore, the device employed must be capable of compensating these differences. In the second case, it is possible to simultaneously trace a plurality of pre-recorded wave-patterns by the propagated wave, whereby selection of the phonated sound may be effected by the path traced coincident with one of the pre-recorded wave-patterns. Here again, both the tracing rate and amplitude of the arriving wave must be continually controlled, in order that a sensible coincidence of the two waves may be attained. Moreover, in ordinary speech, action of the larynx complicates the shape of the wave-patterns, and therefore, the chances of coincidence of any wave trace becomes random. Systems in which the first or second type of wave analysis is utilized may be referred to the following patents in their respective order: No. 2,195,081, March 26, 1940 issued to Homer W. Dudley; and No. 2,137,888 November 22, 1938 issued to Wallace W. J. Fuller.

Considering the various difficulties involved in the previous attempts of translating audible articulation into visible intelligible indicia, I contemplate a closer approach to the problem, by providing a method which excludes the importance of variables, such as frequency pitch, and amplitude of the waves. I have found that in all articulated sound waves, the complex wave may be subdivided into groups of waves, in a sense that, each group will constitute a wave-pattern occurring between such waves as have a higher amplitude than those in a group of waves. The shape of each of these wave-patterns determines the intelligibility of a particular phonation. Owing to this fact, it is possible to derive significantly a different ratio from the differences of minor peaks of each of the wave-patterns, and translate these ratios into discrete signals for the operation of character-printing mechanisms. In a typical phonated sound, there exists a train of at least several wave-patterns; even during the shortest plosive sounds, such as the sound K. As pointed out previously, these successive wave-patterns will vary in shape, and therefore, the ratios derived therefrom will vary accordingly. However, these variables will be distinguishable from the variables of other phonations, and they can be easily reduced to discrete signals by a special ratio meter employed herein.

Accordingly in one exemplary embodiment of the invention, there is provided a method for simplifying the phonated sound waves in such a way that they may be suitably utilized for the control of character printing keys corresponding to the phonetic characters represented by the speech. Briefly, the method comprises the following steps: Subdividing the speech waves into wave trains that occur between major peaks; sampling each wave train at intervals corresponding to its minor peaks; adding each successive sample in one of four storage elements according to a pre-arranged sequence; then at the end of a wave train, measuring the ratio of the differences between two pairs of the totalized samples, thereby to obtain an indication of the phonetic character represented by the wave train. With reference to the given steps, such as: subdividing the speech wave into trains of waves; and deriving therefrom significantly different ratios representative of the phonations, it is apparent that the importance of frequency and amplitude of the waves is eliminated.

In another embodiment of the invention, there is provided a ratio meter, which is capable of reducing the aforementioned variables of the said ratios into discrete signals, and also provides independent output terminals for each significantly different ratio. This ratio meter consists of a special cathode-ray tube, wherein an electron beam is directed upon radially spaced target anodes of predetermined arrangement. In this tube, there is provided two pairs of beam-deflecting (horizontal and vertical) plates, upon which, the aforesaid two pairs of totalized samples are applied. Thus, the ratio derived from the totalized samples is characterized by the specific angular deflection of the beam, which is utilized to select one of the prearranged target anodes in its path. Here again, since the targets are arranged around a circle, any number of targets may be employed to cover the said variables of each phonation, and connect same electrically, to represent a single output terminal. Further, since the target anodes (representative of phonetic characters) are independent of each other, they may be connected independently to actuate character printing keys, such as the keys of an electric typewriter. However, the type of printing mechanism is immaterial herein, and will not be disclosed or shown, as the present invention is primarily directed to the translation of speech waves into discrete signals corresponding to the phonetic characters represented by the speech.

My invention will be better understood from the following description, and by reference to the attached drawings, additional novelty of the invention will appear to the skilled in the art of electronics.

Figure 2:
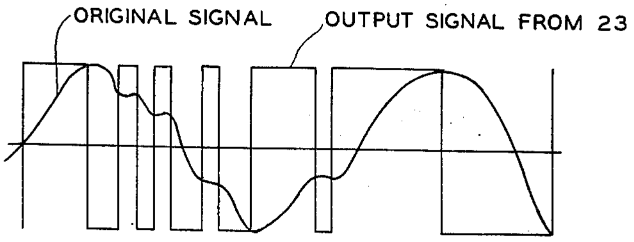
Fig. 2 is a waveform for explaining the operation of Fig. 1.

In describing various circuit arrangements in proper order, and the manner in which they cooperate one with another to form an exemplary system embodying the invention, reference is first made to Fig. 2, which illustrates a complex wave of arbitrary form. As mentioned in the foregoing, the wave trains are sampled at intervals corresponding to each succeeding peak, and these samples are distributed additively across four storage elements in a predetermined sequence. If it were the case that each constituent wave reversed in polarity, such reversal could be utilized to operate the distributor circuit at the proper instants. However, a complex wave as shown in the drawing consists of alternating waves of variable frequency, superimposed by unidirectional waves; also of variable frequency. Accordingly, to effect operation of the distributor circuit at intervals corresponding to succeeding wave-peaks, an arrangement capable of reversing the polarity of each wave in the illustrated form of square waves is given in the following.

Figure 1:
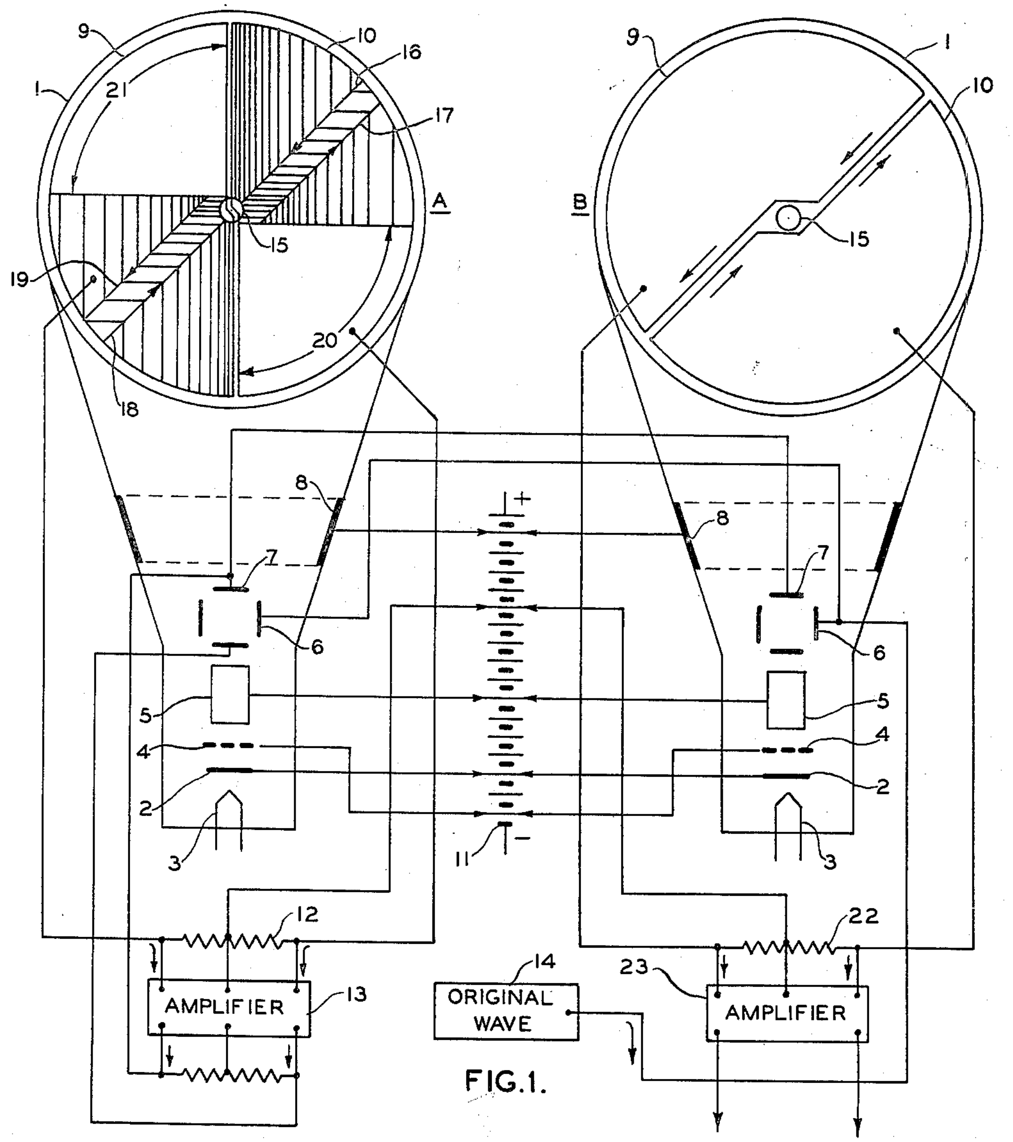
Fig. 1 is a diagrammatic illustration of wave differentiating targets and circuits therefor, in accordance with the invention.

In Fig. 1, the cathode ray tubes A and B comprise glass envelopes 1 having cathodes 2, filaments 3, control grids 4, cathode beam-focusing anodes 5, horizontal beam-deflecting electrostatic plates 6, vertical beam-deflecting plates 7, electron collecting anodes 8, and secondarily emitting targets 9 and 10. The power source 11 is shown to supply the proper potentials to the respective elements of both tubes A and B, and their beam deflecting sensitivities are adjusted to be similar for simultaneous operation. The potential source for the filaments 3 is not shown for simplicity of drawing.

The secondarily emitting targets 9 and 10 of tube A are connected to an output impedance 12, and the signals across this impedance are amplified by the amplifier 13. This amplifier is arranged to be linear in operation and without phase shift, and drives the vertical deflecting plates 7 of both tubes A and B simultaneously in accordance with the signals derived from the secondarily emitting target 9 and 10 of tube A. The horizontal deflecting plates of both tubes A and B are driven simultaneously by the original speech wave arriving from source 14.

The surfaces of secondarily emitting targets 9 and 10 of tube A; facing perpendicular to the axis of electron beam 15, are coated with non-emitting material (such as is practiced in making monoscopes in television art) in varying values to form a shaded pattern as illustrated. More specifically, and making reference to the target 10, at the normal center position of beam 15 the target 10 is coated heavily to cause the minimum of emission. By drawing a reference 45° line 16 and a parallel line 17 of a few electron-beam widths from 16, the narrow spacing of 45° area is coated with linear values; lighter as its goes upwards. The right hand side area of line 17 is also linearly coated; lighter toward the right. On the left hand area from 45° line 16, the shading is linear such that it is darkest at the extreme left. The shaded coating upon the surface of target 9 is an opposite replica of the shading of target 10, as illustrated in the drawing. The function of these shadings is described in connection with the operation of tubes A and B, as follows:

The original speech wave from source 14 is applied upon the horizontal deflecting plates 6, which controls the beam position in horizontal direction. The vertical deflecting plates 7 are controlled by the amplifier 13, which receives its excitation depending upon the amount of secondary emission emitted from targets 9 or 10 of tube A. The sensitivity of amplifier 13 is adjusted to cause equal magnitude of vertical deflection by a given value of secondary emission at a given target area at which the beam 15 is deflected horizontally by the signal arriving from source 14. This will cause a 45° deflection of electron beam 15.

In operation, assume that a signal arriving from source 14 deflects the beam to the right upon target 10. The beam travels horizontally from its normal center position to the right until it reaches 45° line 17, wherefrom it travels upward at a 45° angle. When the signal upon horizontal deflecting plates 6 subsides, the beam travels leftward horizontally, as at this point the shading remains the same until the beam reaches 45° line 16. From this line 16, the beam moves downwards at a 45° angle, as indicated by the arrow. Any unidirectional variation in amplitude of the signal at the horizontal deflecting plates 6 will cause the beam 15 to shift back and forth across the 45° area between lines 16, 17 and 18, 19, provided that the magnitude of variation is equal to or larger than the width of 45° area. That is, if the beam is driven towards the right, it will travel upwards on line 17, and if driven towards the left, it will travel downwards on line 16. In the event that the signal originating at source 14 drives the beam 15 to the left from its normal center position and shifts upon target 9, then the beam travels downwards on line 19 while being driven to the left, and it travels upward on line 18 while being driven to the right. Areas 20 and 21 of targets 10 and 9 are not shaded, since these areas are not utilized. But if desired, they may be eliminated entirely.

The horizontal and vertical deflecting plates of both tubes A and B in Fig. 1 are connected in parallel, and therefore, the beams of both tubes are driven in synchronism. Accordingly, the separation line between the targets 9 and 10 of tube B is arranged so that each time the beam 15 of tube A shifts back and forth across 45° lines 16, 17 and 18, 19, the beam 15 of tube B shifts back and forth across targets 9 and 10 of tube B. Since targets 9 and 10 of tube B are not coated with non-emitting material, the secondary emission from these targets remains constant and the targets apply alternate waves of constant magnitude across load resistance 22 and amplifier 23, in the form as shown in Fig. 2.

It may be noted that the 45° separation line is not restricted to any particular angle, as this angle is determined by the amplification factor of amplifier 13. However, it is essential that the angle of separation of the signal generating anodes 9 and 10 of tube B coincide with the 45° area of anodes 9 and 10 of tube A.

Figure 3:
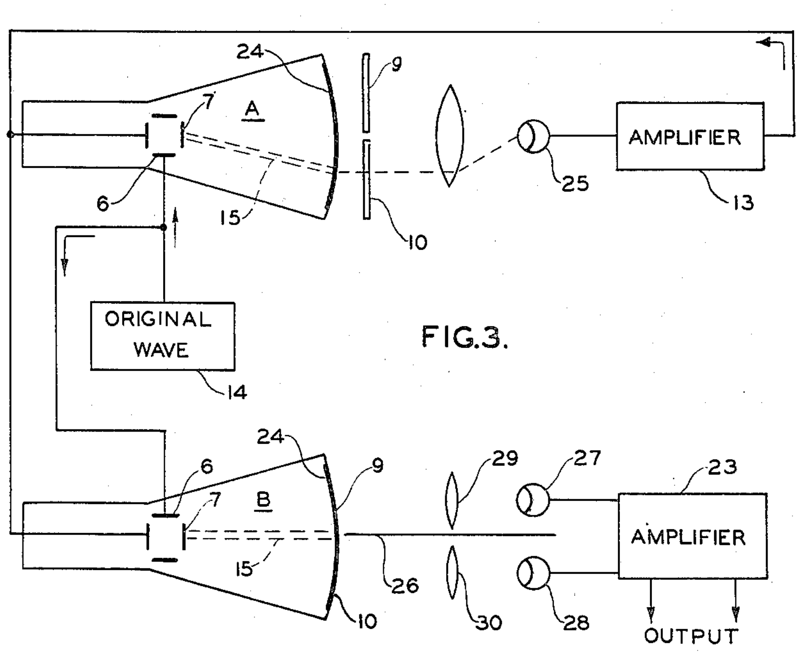
Fig. 3 is a modified arrangement which may replace the arrangement of Fig. 1.

A further modification that may replace the arrangement of Fig. 1 is shown in Fig. 3. In Fig. 3, the fixed shaded pattern is photographed on a transparent film or glass plate 9, 10 (shown in side view), and placed in front of the luminescent screen 24 of a conventional cathode ray tube A, so that the focused spot of light on the screen passes through the film 9, 10 onto the cathode of photoelectric cell 25 in varying light values in accordance with the shaded pattern of the film.

In operation, the electron beam 15 is swept across the phosphorescent screen 24 by the original speech wave arriving from source 14, which is applied upon the beam-deflecting plates 6. According to the shaded pattern on the film 9, 10, the varying potentials of photoelectric cell 25 are amplified by 13 and applied upon the beam-deflecting plates 7. In effect, the beam 7 is deflected in the same manner, as explained by way of Fig. 1.

By way of parallel operation, the cathode beams of tubes A and B in Fig. 3 are deflected in synchronism. Then, by placing an opaque shield 26 having the same shape as the separation between targets 9 and 10 of tube B in Fig. 1, the focused spot of light on the luminescent screen of tube B in Fig. 3 projects upon the photoelectric cells 27 and 28 through lenses 29 and 30, at approximate peaks of the speech wave. The alternate voltages of cells 27 and 28 may be amplified by 23 in the form of square waves, as given in Fig. 2.

Figure 4:
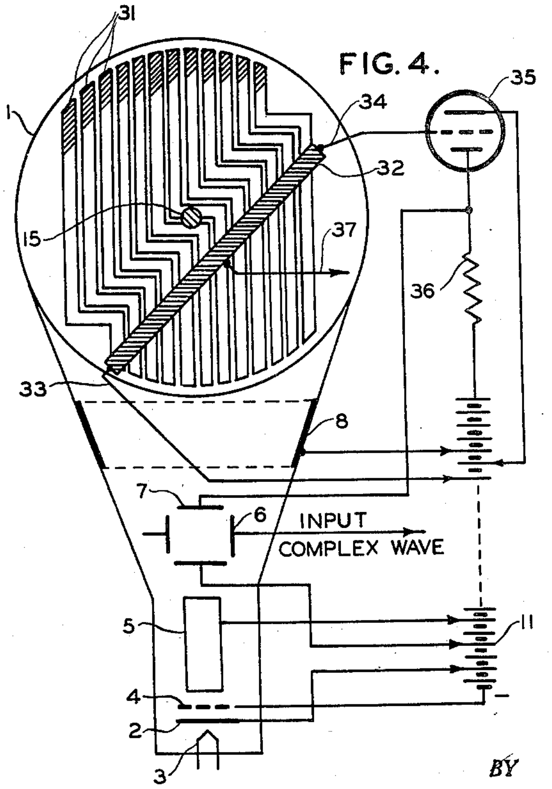
Fig. 4 is a wave differentiator, similar to the arrangement of Fig. 1, but utilizing target of modified structure.

In order to stabilize the operation of tube A in Fig. 1, the targets 9, 10 may be constructed in the form as shown in Fig. 4. In this structure, the shaded pattern is formed by metallic stripes 31, which are mutually connected by resistance 32 in incremental voltage dividing steps. The metallic stripes 31 may be constructed by a metal foil supported on the plane surface of an insulating plate, and cut into stripes in the form as illustrated in the drawing, by a die, or by photographing and etching as may be desired. The resistance element 32 may be a permanent coating on the target by a suitable resistive material. To effect operation similar to Fig. 1, one end 33 of resistance 32 is connected to the cathode 2 through high voltage supply 11, and the other end 34 is connected to the control grid of amplifier tube 35, which amplifies the target potential sufficiently at its plate circuit resistance 36 for the necessary amount of beam deflection. As will be noted from the different structures of targets given in Figs. 1 and 4, the first depends upon the amount of secondary emission to produce the necessary control potential, and the second depends upon the amount of resistance that the electron beam flows through to produce the necessary potential for controlling the beam-deflection. In the first case, the ink coating is usually susceptible to burn out by prolonged electron bombardment. Whereas in the second case, the metallic stripes will tolerate steady bombardment of electrons, and therefore it is preferred to the first.

In Fig. 4, a center tap 37 of resistance 32 is provided for balanced output. In which case, the center tap 37 may be directly connected to the cathode 2 through high voltage supply 11, and the terminals 33, 34 may be utilized to apply control potentials upon the vertical beam-deflecting plates 7. Since the magnitude of control potentials obtained from terminals 33 and 34 of resistance 32 depends upon the intensity of electron beam flow, it is obvious that amplifiers for these control voltages may be dispensed with if the intensity of beam current is large enough. Because of many like parts of Figs. 1, 3 and 4, most of the numeral indications are repeated for convenience.

Figure 5:
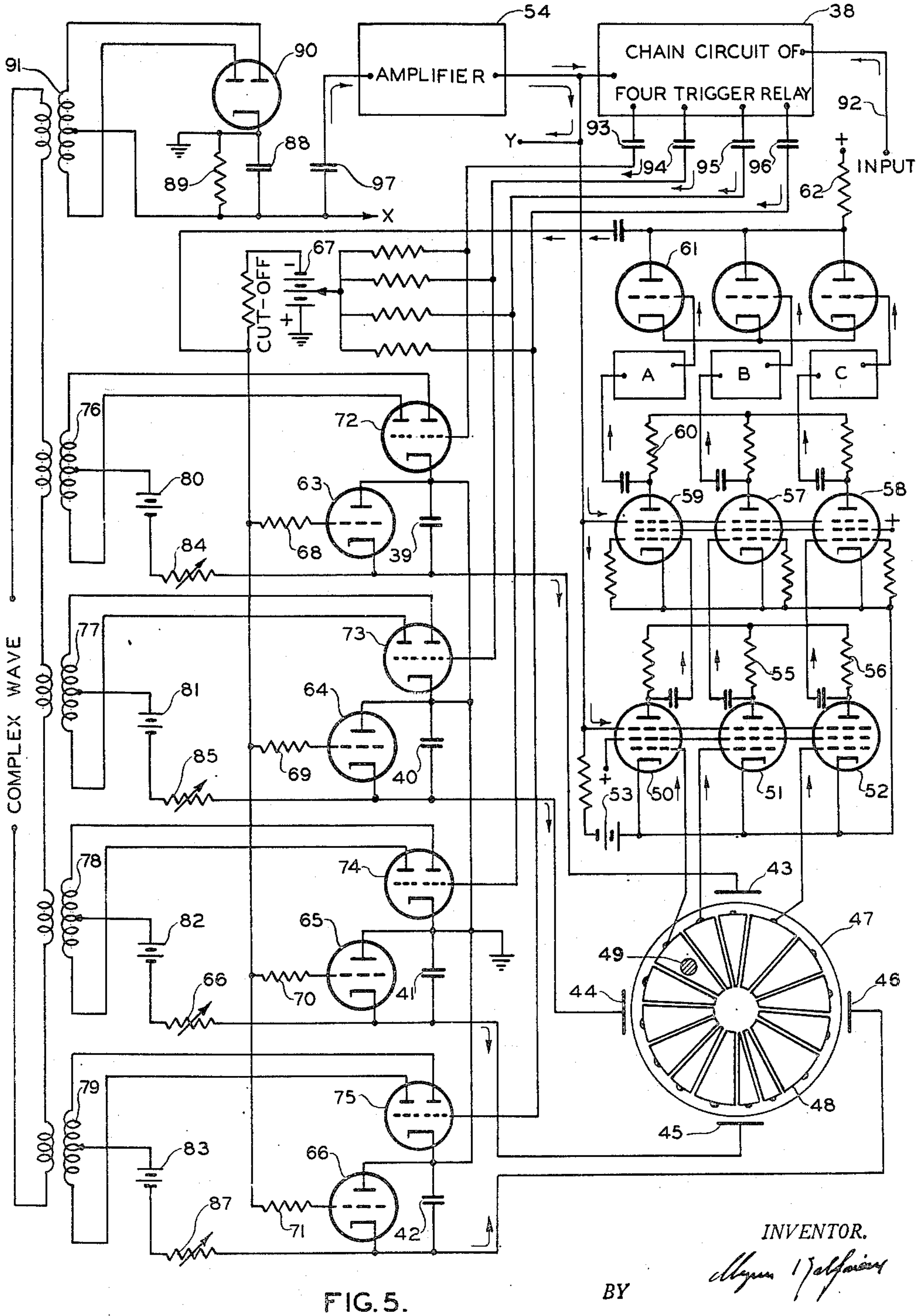
Fig. 5 is a diagram of speech wave-pattern analizer in accordance with the invention.

Fig. 5 is a circuit diagram of speech wave-pattern analyzer, which comprises a distributor chain circuit of four trigger relays 38, and four storage condensers 39—42, which are directly connected to the electrostatic beam-deflecting plates 43 to 46 respectively of a specially constructed cathode ray tube 47. For simplicity of drawing, most of the usual elements contained in a cathode ray tube are omitted, and only a plurality of targets 48 in the path of electron beam 49 are shown. Each one of the targets has an output terminal, of which three terminals are shown connected to the control grids of vacuum tubes 50, 51 and 52. The plate currents of tubes 50—52 (and others not shown) are normally cut off by the negative bias supply 53 applied upon the suppressor grids of these tubes. Normally, the first control grids of tubes 50—52 are at or near cathode potential, and they are driven cathode current cut off by independent negative potentials produced across targets 48. As stated previously, most of the essential parts of cathode ray tube 47 are excluded from the drawing. But it is obvious that, independent resistance elements are connected from each of the targets to the original electron emitting cathode (through necessary high voltage supply), so that beam current may flow through them for the production of aforesaid negative potentials.

The plate conductance of tubes 50—52 are effected by a positive pulse arriving (at the end of each wave train) from the amplifier 54. But due to the double grid controls of these tubes, the tube that had received a negative voltage upon its first control grid from one of the targets 48 remains non-conductive at the arrival of positive pulse from 54. Thus assuming (as illustrated in the drawing) that the first grid of tube 50 has received a negative potential from one of the target elements at the arrival of a positive pulse from amplifier 54, the tubes 51 and 52 become conductive, and the negative potentials developed across their respective plate circuit resistances 55 and 56 apply negative pulses upon the first control grids of tubes 57 and 58. These negative pulses prevent plate conductance of tubes 57 and 58, but the simultaneous positive pulse arriving from amplifier 54 upon normally negative biased suppressor grids of tubes 57—59 causes tube 59 to become conductive, and the voltage change across its plate circuit resistance 60 is utilized to operate a mechanical relay as represented by the block A, for the purpose of printing a phonetic character. Only three blocks (A, B, C) are shown in the drawing, but there may be as many as the alphabetical characters in speech; and similarly there would be as many target elements in the cathode ray tube 47, with as many associated circuit elements.

Continuing with the operation of block A, its operation causes a negative pulse upon the control grid of tube 61, which in turn sends a positive pulse from across its plate circuit resistance 62 to the control grids of tubes 63—66, simultaneously. These tubes immediately become conductive from their normal non-conductive states by virtue of the negative bias battery 67, and discharge electrical charges in condensers 39—42 that had been stored previously. The resistances 68—71 in series with the control grids of tubes 63 to 66 respectively are included, in order to limit grid currents in the event that the positive pulse from 62 exceeds a normal value.

The storage condensers 39—42 are charged additively in proportional magnitudes of the peaks of speech waves arriving from coils 76—79 in series with normally non-conductive grid controlled rectifier tubes 72 to 75 respectively. The sequence of additive charges across these condensers is controlled by the chain of four trigger-relay circuit 38, which operates the rectifier tube in a pre-arranged sequence by applying positive pulses upon their normally plate current cut off grids, at the peaks of the speech wave. The sequential operation of trigger circuit 38 is achieved by applying the alternating wave obtained from amplifier 23 in Fig. 1, or from other source that may produce the desired alternating wave, upon the trigger circuit 38 at its input terminal 92. Trigger circuits in chain operation are too numerously described in texts and scientific periodicals, and need not be described herein.

For additive charges of condensers 39—42, resistances 84 to 87 respectively are included in series with the condensers, so as to effect slow charge at a time. Also, batteries 80 to 83 are included in series with the condensers 39—42, so as to attain a high D. C. potential upon the plates of discharging tubes 63 to 66 for speedy discharge of the condensers when short positive pulse arrives upon their control grids from resistance 62. However, batteries 80—83 are not absolutely essential, and may be dispensed with if so desired.

In order that the mechanical relay for printing phonetic characters, such for example indicated by the block diagrams A, B, C, etc., operate at the end of a wave train, and also that the trigger circuit 38 may commence from a pre-set operating position, and further yet that these starting and ending points occur at major peaks of the speech waves, for selecting definite wave patterns representative of phonetic characters in the speech waves, a peak detector is included, which comprises a storage condenser 88 connected in series with the rectifier tube 90 and coil 91, across which the speech waves are produced from source of complex wave. To effect the production of pules at the major peaks, the value of discharging resistance 89 across condenser 88 is so chosen that, the peak charge in the condenser will decrease very slightly between major peaks and not response to minor peaks, whereas, at each major peak the voltage magnitude across coil 91 will exceed the voltage of condenser 88 and charge it slightly. This additional charge will transmit through a small condenser 97 in the form of a pulse and amplified by 54. As described previously, this amplified pulse is utilized to control the pre-set position of trigger circuit 38; discharge time of condensers 39—42; and the operation time of the mechanical relays in blocks A, B, C, etc.

In consideration of the foregoing, the function of circuit arrangement in Fig. 5 may be more specifically described as follows: Assume that at a major peak of speech wave across coil 91, the condenser 88 transmits a short pulse through amplifier 54 to reset the trigger circuit 38 for normal operation. Also, assume that the differentiated signals from amplifier 23 in Fig. 1 are applied upon the trigger circuit 38 for distributive operation. Each trigger of four trigger circuits in block 38 being independently coupled to the control grids of rectifier tubes 72—75 through coupling condensers 93 to 96 respectively, the pulses from trigger circuits 38 operate the normally non-conductive rectifier tubes 72—75 sequentially at approximate peak intervals of the speech wave; causing proportional charges in condensers 39—42 until a following major peak arrives. At the arrival of a major peak of speech wave, the totalized charges across condensers 39—42 having been applied upon beam-deflecting electrostatic plates 43 to 46 respectively of cathode ray tube 47, the electron beam 49 impinges upon a specific target, the beam current of which causes a negative potential to be applied, for example as shown in the drawing, upon the control grid of tube 50. Simultaneously, the positive pulse from amplifier 54 is applied upon the suppressor grids of tubes 50, 51, 52, and 57, 58, 59, which in effect causes tubes 51 and 52 to become plate conductive and apply negative pulses from across their plate circuit resistances 55 and 56 upon the first control grids of tubes 57 and 58 to render the latter tubes non-conductive, while by virtue of the negative potential upon the first control grid of tube 50 from across a specific target of cathode ray tube 47, it remains non-conductive and tube 59 becomes conductive. Then, the voltage change across plate circuit resistance 60 of conductive tube 59 actuates the relay of a printing mechanism, as represented by the block diagram A. After this final operation, tube 61 is made conductive, and the voltage change across its plate circuit resistance 62 is applied upon the control grids of tubes 63—66 simultaneously to render them conductive from normal non-conductive states and discharge the stored quantities across condensers 39—42 for a new start of wave pattern analysis.

The number of targets 48 in cathode ray tube 47 may be arranged according to the number of letters (phonetic) characters as desired. The width and orientation of the targets may be arranged by first observing or recording the position of the electron beam in a conventional cathode ray tube. The sequence of condenser charging may be arranged differently than shown in the illustration of Fig. 5 to obtain different effects. The grid controlled tubes 72—75 acting as full-wave rectifiers, and also full-wave rectifier tube 90, may be half-wave rectifiers; tubes 72—75 still having control grids for sequential operation. In this case, and with the inclusion of batteries 80—83, more accurate ratios will be obtained from the stored potentials across condensers 39—42, and therefore less errors in the selection of phonetic characters from speech waves.

In order to substitute a conventional cathode ray tube in place of the special tube 47 as shown in Fig. 5, the luminous spot obtained from the phosphorescent screen of a conventional cathode ray tube may be utilized to derive significantly different signals representative of phonetic characters of speech. In this case a photographic film is made having radial divisions in the same shape and number of targets as the tube 47 would comprise, and shaded each division differently. Then by placing the film in front of the phosphorescent screen (externally), the spot of beam-light will have different light values passing through any of said radial divisions. These different values of light may further be passed onto a photoelectric cell to translate into discrete electrical values, and which may be utilized to operate mechanical printing devices. Circuit arrangement for this type of operation is not included herein, as it is only a suggestion of other possible ways that may be utilized to achieve similar results that is to be obtained by the arrangement given in Fig. 5.

While I have shown and described the preferred embodiments of my invention, it will be apparent to those skilled in the art of electronics that other arrangements and components may be utilized within the spirit and scope of the invention.

What I claim is:

1. The method of translating speech waves into discrete signals corresponding to the phonetic characters represented by the speech, which comprises the steps of subdividing the speech waves into wave trains of minor wave-peaks that occur between major wave-peaks producing electric quantities substantially proportional to said peaks, distributing said quantities sequentially into four groups, accumulating the totals of those distributed to each group during one wave train, thereby producing four totalized quantities whose relative magnitudes when the wave train ends depend upon the pattern of relative magnitudes of minor peaks within that wave train, producing a ray, deflecting that ray in a first direction according to the difference between two of the totalized quantities, simultaneously deflecting that ray in a second direction substantially perpendicular to the first direction according to the difference between the other two of the totalized quantities, thereby producing a resultant deflection whose orientation is a function of the ratio of the two differences aforesaid, and which may be interpreted as an indication of the phonetic character in speech waves.

2. The system of translating speech waves into discrete signals corresponding to the phonetic characters represented by the speech, which comprises means for subdividing the speech waves into wave trains of minor wave-peaks that occur between major wave-peaks, four storage elements, means for producing electric quantities substantially proportional to said minor peaks, distributor means to distribute said quantities among the storage elements in a pre-arranged sequence, so as to produce four totalized quantities at the end of each wave train, means for producing a ray, means for deflecting that ray in a first direction substantially in proportion to the difference between two of the totalized quantities, means for simultaneously deflecting that ray in a second direction substantially perpendicular to the first direction in substantial proportion to the difference between the other two of the totalized quantities, so that the resultant deflection may take various directions depending on the ratio of said differences, a plurality of target sectors at predetermined directions from the undeflected path of the ray, said targets being adapted to receive the ray and produce signal currents therefrom, means for detecting major wave-peaks, and discharger means controlled by said detecting means to discharge the previously-totalized quantities at the beginning of each successive wave-train, so that the pattern of minor wave-peaks within that wave-train alone determines which target produces a signal at the end of the wave-train.

3. The system of translating speech waves into discrete signals corresponding to the phonetic characters represented by the speech, which comprises means for subdividing the speech waves into wave trains of minor wave-peaks that occur between major-peaks, four storage elements, means for producing electric quantities substantially proportional to said minor-peaks, distributor means to distribute said quantities among the storage elements in a prearranged sequence, so as to produce four totalized quantities at the end of each wave train, means for producing a ray, means for deflecting that ray in a first direction substantially in proportion to the difference between two of the totalized quantities, means for simultaneously deflecting that ray in a second direction substantially perpendicular to the first direction in substantial proportion to the difference between the other two of the totalized quantities, so that the resultant deflection may take various directions depending on the ratio of said differences, discharger means for said storage elements, a peak detector responsive to said major peaks of the speech waves, such as those that mark the beginnings of phonetic characters, a wave differentiator responsive to the reversals in direction of said wave-peaks, thereby to produce pulses at instants corresponding to said wave-peaks, means to apply said pulses upon said distributor to set it into step by step operation, means to apply detected signals of the peak detector upon the distributor to set it into normal position to commence its step-operation therefrom, means to produce a short pulse after the ending of each wave train, and means to apply last said pulse upon said discharger means to discharge the stored quantities for repetitive operation.

4. The method of translating speech waves into discrete signals corresponding to the phonetic characters represented by the speech, which comprises the steps of subdividing the speech waves into wave trains of minor wave-peaks that occur between major wave-peaks, producing electric quantities substantially proportional to said peaks, distributing said quantities sequentially into four groups, accumulating the totals of those distributed to each group during one wave train, thereby producing four totalized quantities whose relative magnitudes when the wave train ends depend upon the pattern of relative magnitudes of minor peaks within that wave train, producing a ray, deflecting that ray in a first direction according to the difference between two of the totalized quantities, simultaneously deflecting that ray in a second direction substantially perpendicular to the first direction according to the difference between the other two of the totalized quantities, thereby producing a resultant deflection whose orientation is a function of the ratio of the two differences aforesaid, selectively assigning the resultant deflected positions of the ray lying between predetermined limits of orientation as representatives of phonetic characters of the speech waves, selectively deriving discrete signals from last said positions of the ray corresponding to phonetic characters of the speech wave, suppressing the ray and dissipating the stored quantities at the beginning of the next wave train, so that a separate signal may be produced to indicate the phonetic character represented by each successive wave train.

5. In a system for analyzing complex waves that occur in wave trains, each train comprising a series of minor wave peaks following major peaks: A peak detector responsive to the major peaks of the complex waves; a differentiator responsive to the reversals of slope at wave peaks, adapted to produce pulses at the times of both major and minor peaks; four storage elements; means for producing electric quantities substantially proportional to said minor peaks; distributor means to distribute said quantities among the storage elements in a pre-arranged sequence; reset means controlled by said peak detector to restore the distributor to a fixed starting position at each major peak; means controlled by said pulses to advance the distributor one step per pulse; means for producing a ray; means for deflecting the ray in a first direction, the amount of deflection being substantially proportional to the difference between the quantities accumulated by two of the storage elements; means for deflecting the ray in a second direction substantially perpendicular to the first direction, the amount of this deflection being substantially proportional to the difference between the quantities accumulated by the other two storage elements; a plurality of targets in the path of said ray, at various directions from the undeflected path, each adapted to produce a signal when the ray strikes it, thereby indicating when the ratio of the two differences controlling the deflection corresponds to the direction of that target; means for suppressing such indication until the end of a wave train; and discharger means adapted to discharge the accumulated quantities from the storage elements after the end of each wave train.

MEGUER KALFAIAN.

REFERENCES CITED

The following references are of record in the file of this patent:

UNITED STATES PATENTS

| Number | Name | Date |
|---|---|---|
| 1,951,454 | Tieffenbacker | Mar. 20, 1934 |
| 2,137,888 | Fuller | Nov. 22, 1938 |
| 2,195,081 | Dudley | Mar. 26, 1940 |
| 2,403,983 | Koenig | July 16, 1946 |
| 2,403,986 | Lacy | July 16, 1946 |